(12) United States Patent
Balensiefer, II et al.

(10) Patent No.: US 8,328,281 B2
(45) Date of Patent: Dec. 11, 2012

(54) REVERSIBLE CHILD SEAT WITH A RETRACTOR/CONNECTOR MOUNTED TO A LOAD BEARING MEMBER

(75) Inventors: Eugene R. Balensiefer, II, Tipton, IN (US); Jason Boyer, Carmel, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 390 days.

(21) Appl. No.: 12/575,760

(22) Filed: Oct. 8, 2009

(65) Prior Publication Data
US 2010/0090509 A1    Apr. 15, 2010

Related U.S. Application Data

(60) Provisional application No. 61/104,071, filed on Oct. 9, 2008, provisional application No. 61/104,073, filed on Oct. 9, 2008.

(51) Int. Cl.
*B60N 2/28* (2006.01)

(52) U.S. Cl. .................................. 297/256.14; 297/250.1

(58) Field of Classification Search ............... 297/250.1, 297/256.14, 256.16
See application file for complete search history.

(56) References Cited

U.S. PATENT DOCUMENTS

| | | | |
|---|---|---|---|
| 5,890,762 A * | 4/1999 | Yoshida | 297/256.13 |
| 6,193,310 B1 * | 2/2001 | Batalaris et al. | 297/253 |
| 6,450,576 B1 | 9/2002 | Rhein et al. | |
| 6,764,135 B2 * | 7/2004 | Sasaki et al. | 297/256.16 |
| 6,962,394 B2 | 11/2005 | Anthony et al. | |
| 7,029,068 B2 * | 4/2006 | Yoshida et al. | 297/250.1 |
| 7,059,676 B2 * | 6/2006 | McNeff | 297/250.1 |
| 7,278,684 B2 * | 10/2007 | Boyle | 297/253 |

* cited by examiner

*Primary Examiner* — Peter R. Brown
(74) *Attorney, Agent, or Firm* — Woodard, Emhardt, Moriarty, McNett & Henry LLP

(57) ABSTRACT

A web extension and retraction device on a child seat. A pair of retractors are mounted to the device and have webs extendable therefrom with connectors releasable with vehicle anchors both when the child seat faces forward and rearward in the vehicle. In one embodiment the retractors slide in cavities provided on opposite sides of the child seat.

20 Claims, 20 Drawing Sheets

REVERSIBLE CHILD SEAT WITH A RETRACTOR/CONNECTOR MOUNTED TO A LOAD BEARING MEMBER

This application claims the benefit of U.S. Provisional Application No. 61/104,071, filed Oct. 9, 2008, which is hereby incorporated by reference and of U.S. Provisional Application No. 61/104,073, filed Oct. 9, 2008, which is hereby incorporated by reference.

BACKGROUND OF THE INVENTION

1. Field of the Invention

The present invention relates generally to the field of retractors and connectors for anchoring a child seat.

2. Description of the Prior Art

Child seats are anchored atop a vehicle passenger seat to face either forward or rearward. In either case, webs mounted to the child seat are extendable having connectors on the distal ends to releasably lock to anchors located in the bight of the passenger seat.

A variety of commercially available child seats include a seat portion and back portion affixed atop a child seat shell, in turn, having a variety of retractors and web adjusters for controlling the extension of the webs to the vehicle seat anchors. It is desirable to provide a child seat that may be readily and easily switched between a forward facing position and a rearward facing position. Many of the prior child seats can be reversed; however, the anchoring webs need to be rerouted or rearranged. Disclosed herein are several embodiments of a retraction based lower anchor connection system that eliminates the need to reroute the lower anchor connection webs from forward to rear facing modes, and vice versa.

SUMMARY OF THE INVENTION

One embodiment of the present invention is a mount for selectively securing in a forward facing position and a rearward facing position a child seat to vehicle anchors. A pair of retractor guides are on a child seat with the child seat located therebetween. The guides have opposite ends with stop surfaces. Retractors are mounted to the guides and have webs extendable and retractable therefrom. The retractors and webs are slidable between the opposite ends of the guides with the webs having distal ends. A pair of anchor connectors are connected to the distal ends of the webs. The connectors are lockingly engageable with anchors provided on the vehicle to secure the child seat to the vehicle seat.

DESCRIPTION OF THE PREFERRED EMBODIMENTS

Figure 1:
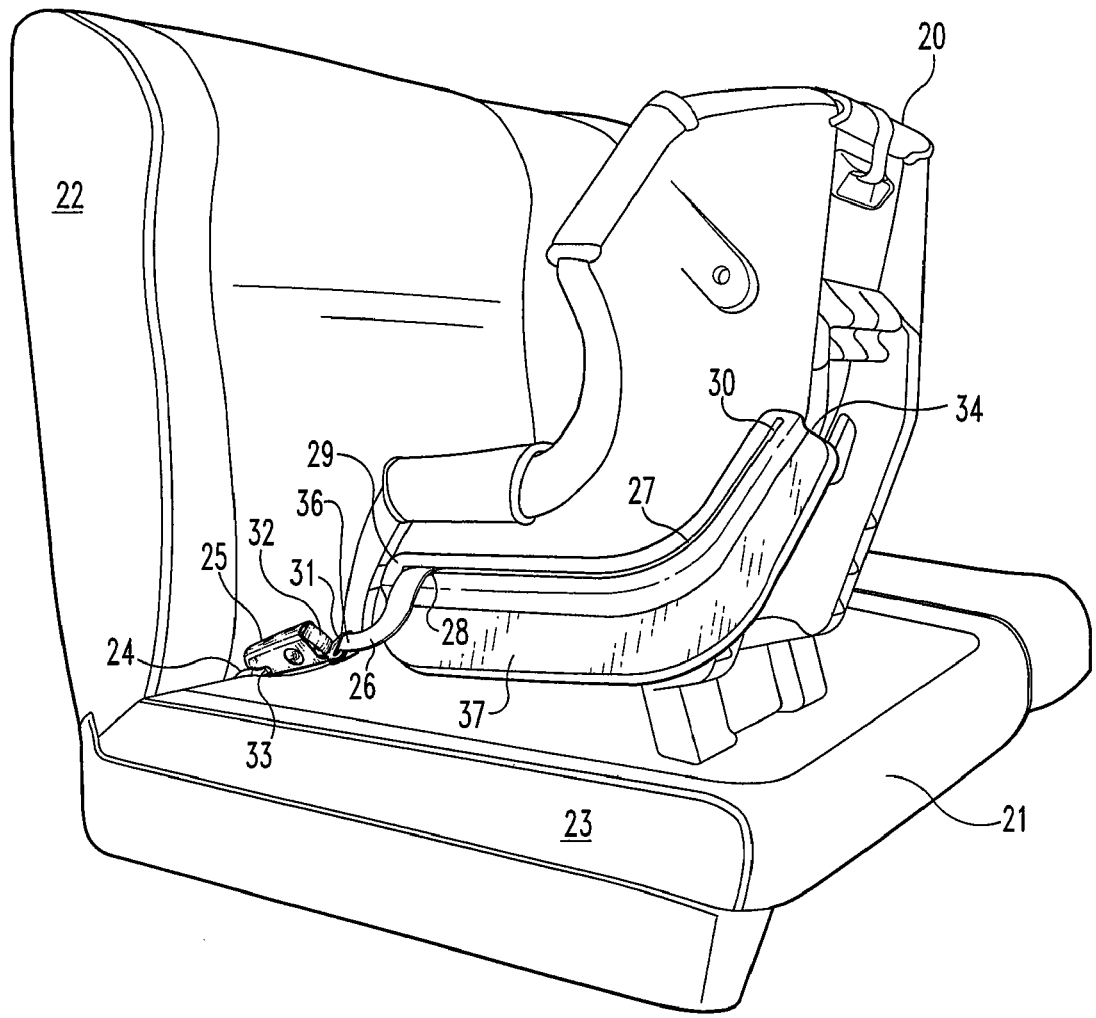
FIG. 1 is a perspective view of a rear facing child seat mounted atop a vehicle passenger seat with the preferred embodiment of the retractor/connector affixed to a load bearing member of the child seat.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The preferred embodiment of the present invention is shown in FIG. 1. Child seat 20 is mounted atop a vehicle passenger seat 21 consisting of a seat back portion 22 and a seat portion 23. A conventional anchor bight 24 is located at the intersection of the seat back portion 22 and seat portion 23. A connector 25 mounted to one end 36 of web 26 and is lockingly engageable with bight 24. Web 26 has an opposite end mounted to a conventional automatic locking retractor (ALR) slidably mounted to child seat 20 and concealed within retractor housing 37 mounted to the side of the child seat. Housing 37 has a slot 27 with an enlarged opening 28 located at housing end 29 and an enlarged opening 30 located at housing end 34. Web end 36 is attached to connector flange 31 with the web end extending through an opening in the flange and being doubled back and fixedly attached to the main body of the web.

Slot 27 has a width greater than the thickness of web 26 but less than the thickness of flange 31 or the combined thickness of flange 31 with the attached web 26. Openings 28 and 30 each have a width greater than either the thickness of flange 31 or the combined thickness of flange 31 and the attached web 26. Thus, the retractor within housing 37 can withdraw both the web 26 and flange 31 into housing 37 when flange 31 is located at openings 28 or 30; however, web 26 may be moved along slot 27 between the opposite enlarged openings while flange 31 remains external to the retractor housing 37.

Figure 2:
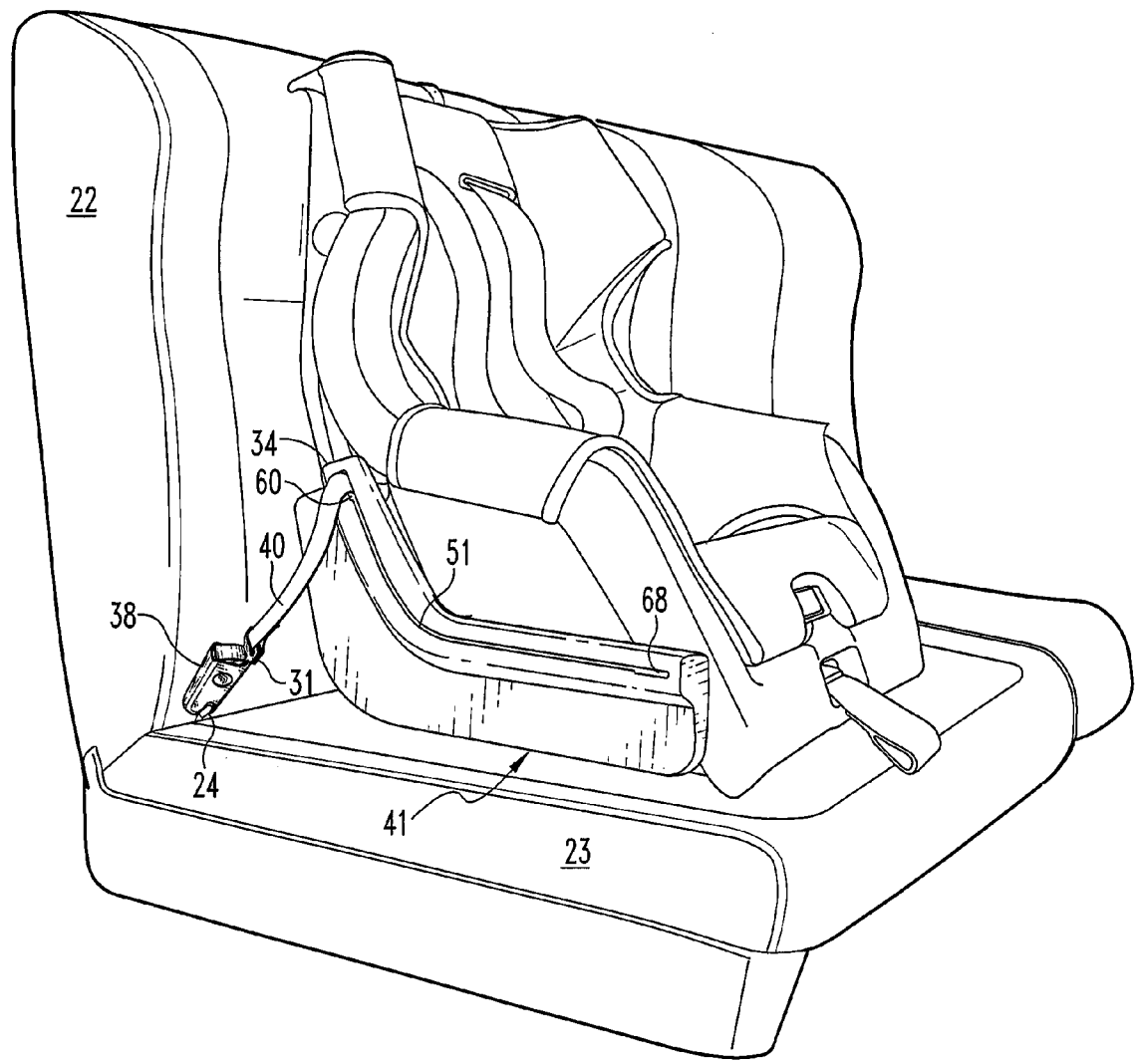
FIG. 2 is the same view as FIG. 1 only showing the child seat facing forward atop the vehicle passenger seat with the same retractor/connector shown in FIG. 1 engaged with the anchor.

When child seat 20 is facing forward (FIG. 2) on the vehicle seat, web 26 extends outwardly from opening 30 whereas with the child seat facing rearwardly (FIG. 1) on the vehicle seat, web 26 extends outwardly from opening 28. In the event, the child seat is changed from facing forward to rearward then web 26 is moved from opening 30 along slot 27 to opening 28 whereas the web is moved in an opposite direction if the child seat is to be moved from facing rearward to facing forward. When the child seat is not mounted to the vehicle seat, the retractor within housing 37 withdraws web 26 positioning and holding connector 25 at either opening 28 or 30 with flange 31 extending into opening 28 or 30 preventing the connector and web from dangling from the child seat allowing the child seat to be carried without fear of the connector and web snaring an external object.

Figure 3:
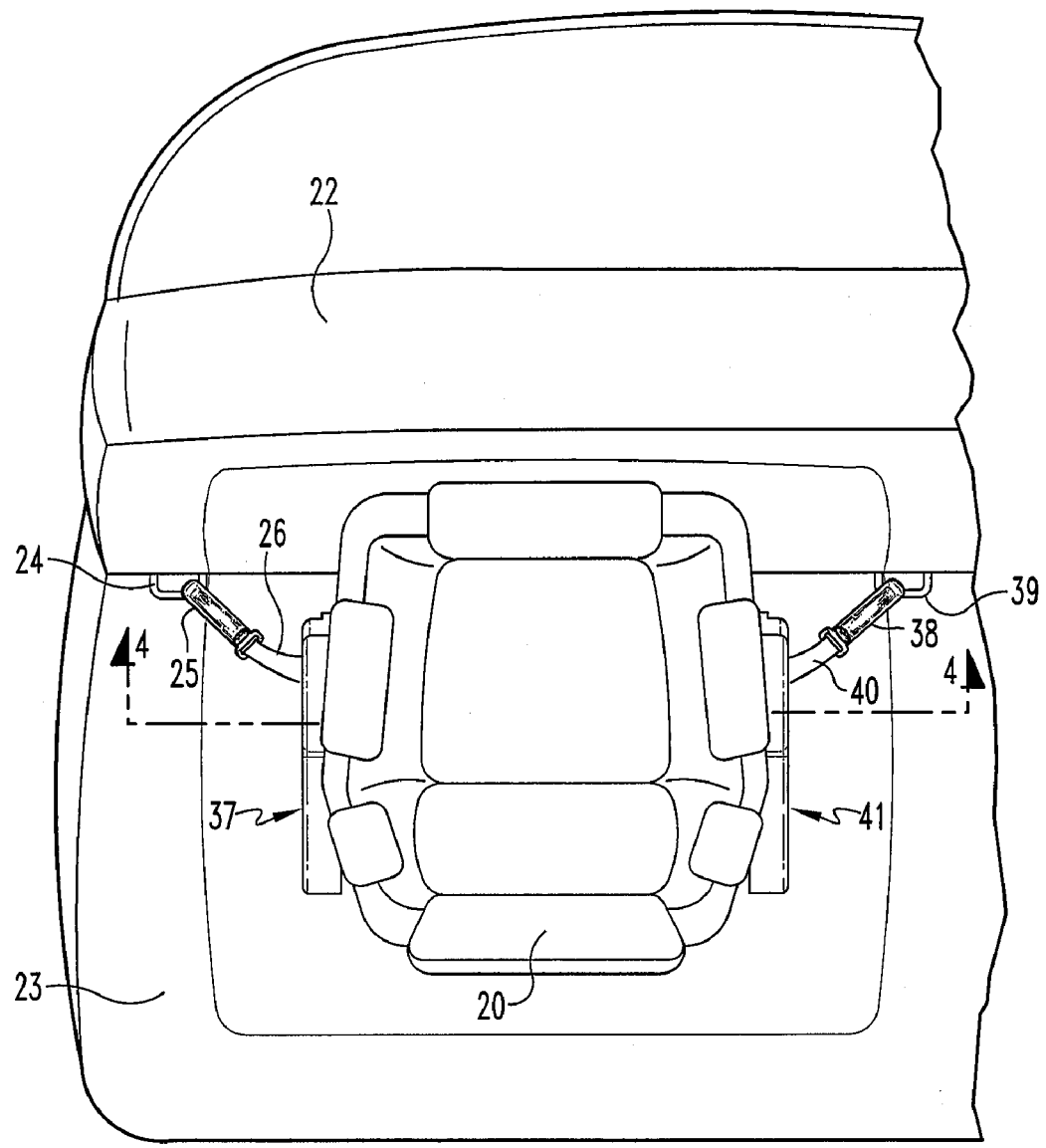
FIG. 3 is a top view of the child seat of FIG. 1.

The child seat has a connector 38 (FIG. 3) lockingly engageable with anchor 39 located at the intersection of the vehicle seat back portion 22 and seat portion 23 with a web 40 extendable into a retractor housing 41 mounted to the opposite side of the child seat thereby providing a pair of identical connectors 25 and 38 to engage two anchors 24 and 39 mounted in the bight of the vehicle seat and spaced apart for the child seat to be positioned therebetween. Retractor housing 41 is a mirror image of housing 37 with a slot identical to slot 27 and a pair of opposite enlarged openings through which web 40 extends in a manner identical to that described for slot 27 and web 26. Thus, connector 38 and web 40 operate in a manner identical to that described for the operation of connector 25 and web 26.

Figure 4:
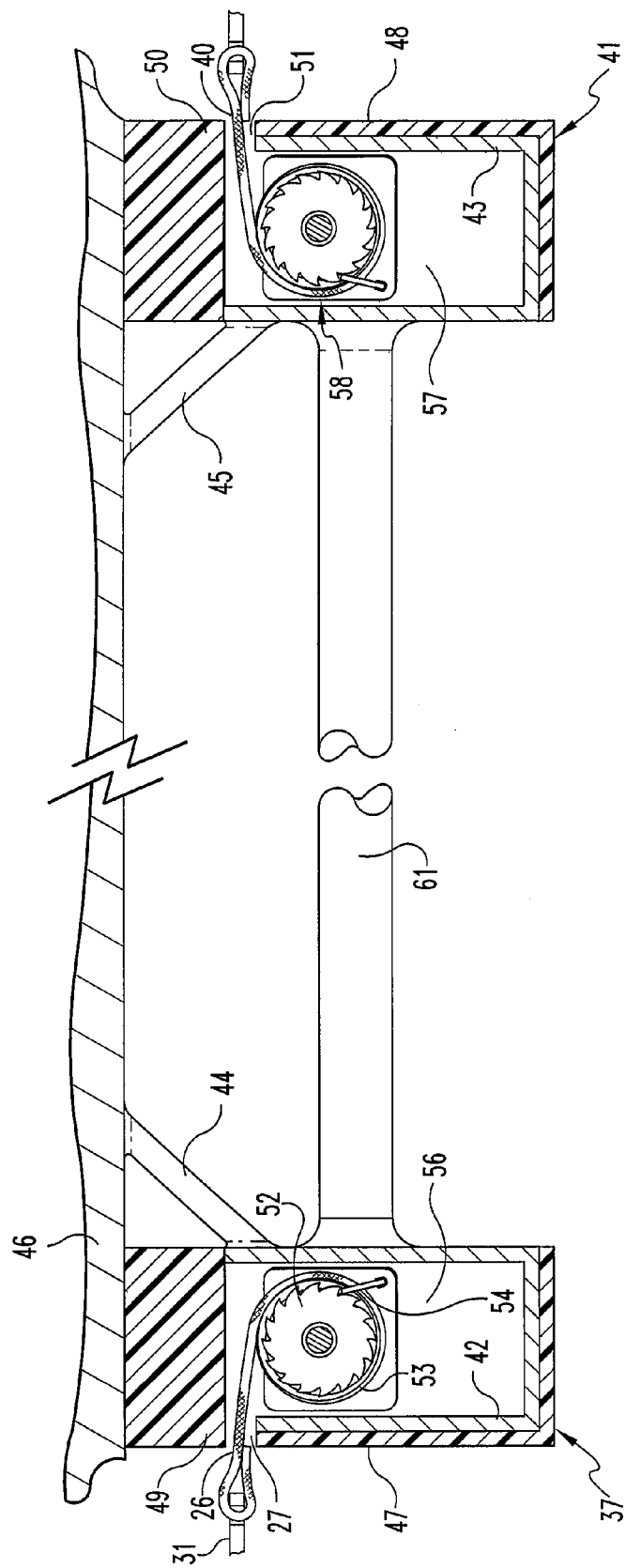
FIG. 4 is a schematic, enlarged, fragmentary, cross sectional view taken along a line 4-4 of FIG. 3 and viewed in the direction of the arrows of the two retractor housings secured together and mounted to the frame of the child seat illustrating the webs from the retractors extending outwardly from the retractor housings.

Many variations are contemplated and included in the present invention for the mounting of retractor housings 37 and 41 to the opposite sides of the child seat. Housing 37 and 41 may include respectively U-shape metal walls 42 and 43 fixedly (FIG. 4) mounted to braces 44 and 45 in turn fixedly mounted to the frame 46 of the child seat. Member 61 is attached to U-shaped walls 42 and 43 and extends therebetween. L-shaped plastic outer coverings 47 and 48 may be mounted externally to walls 42 and 43. Plastic top spacers 49 and 50 are joined to coverings 47 and 48 and are located adjacent child seat frame 46.

Housings 37 and 41 have slots 27 and 51 through which the retractor webs extend. Slots 27 and 51 follow a concave curve when viewed from atop the child seat. The ALR retractors are conventional in design and include rotatably mounted spools with ratchet shaped end plates releasable engageable with spring biased pawls to allow the webs to be extended enabling locking engagement of the connectors 25 and 38 (FIG. 3) with the passenger seat anchors 24 and 39. For example, retractor 52 (FIG. 4) has a spool 53 rotatably mounted to the retractor frame with web 26 extendable from the retractor and through slot 27 of the retractor housing 37. A spring biased pawl 54 is arranged relative to the ratchet teeth on the spool 53 to allow the web to be pulled outwardly until slightly released with the pawl then dropping into place preventing further withdrawal of the web. Slot 27 is sized to allow web 26 to freely extend therethrough but prevents passage of the connector mounting flange through the slot until the web is slid along the length of slot and positioned in openings 28 or 30 which are wider allowing the web 26 and flange to extend into the retractor housing.

Housings 37 and 41 form respectively retractor cavities 56 and 57 in which are positioned retractors 52 and 58 to allow the retractors to slide along the length of the retractor housings between opening 28 and 30 for housing 37 and opening 60 and 68 for housing 41. The U-shaped metal walls 42 and 43 are sized to limit rotation of the retractors 52 and 58 within the cavities in order that webs 26 and 40 are aligned respectively with slots 27 and 51. Walls 42 and 43 extend to adjacent slots 27 and 51 to limit movement of webs 26 and 40 along the concave curve followed by the slots.

Figure 5:
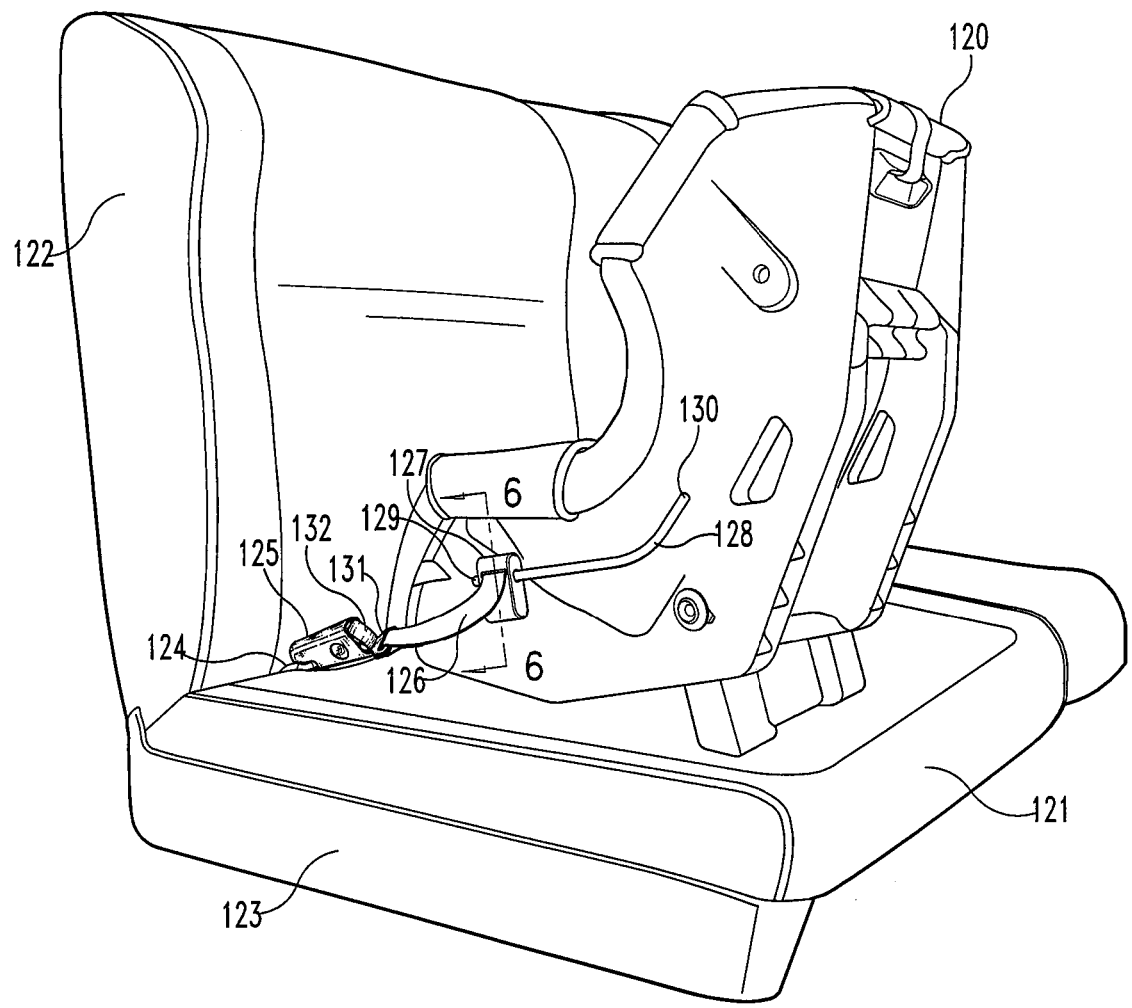
FIG. 5 is a perspective view of a rear facing child seat mounted atop a vehicle passenger seat with the first alternate embodiment of the retractor/connector affixed to a load bearing member of the child seat.

Referring now more particularly to FIG. 5, there is shown the first alternate embodiment of the present invention having a connector 125 mounted to one end of a web 126 that has its opposite end mounted to a retractor 127 slidably mounted to a load bearing rod 128 having its opposite ends 129 and 130 fixedly mounted to child seat 120. Child seat 120 is mounted atop a vehicle passenger seat 121 consisting of a seat back portion 122 and a seat portion 123. A conventional anchor bight 124 is located at the intersection of the seat back portion 122 and seat portion 123.

One version of connector 125 is disclosed in the commonly owned U.S. Pat. No. 6,962,394 which is herewith incorporated by reference in its entirety. The connector has a mouth receiving the anchor bight positioned between the passenger seat back and bottom seat portion. A push button 132 is used to move the lever to release the connector from the anchor bight. A spring biased lever mounted in the connector extends around the anchor when the anchor is positioned in the connector mouth. Connector 125 has an outwardly extending bracket 131 having a slot through which web 126 extends and is thereby attached.

Figure 6:
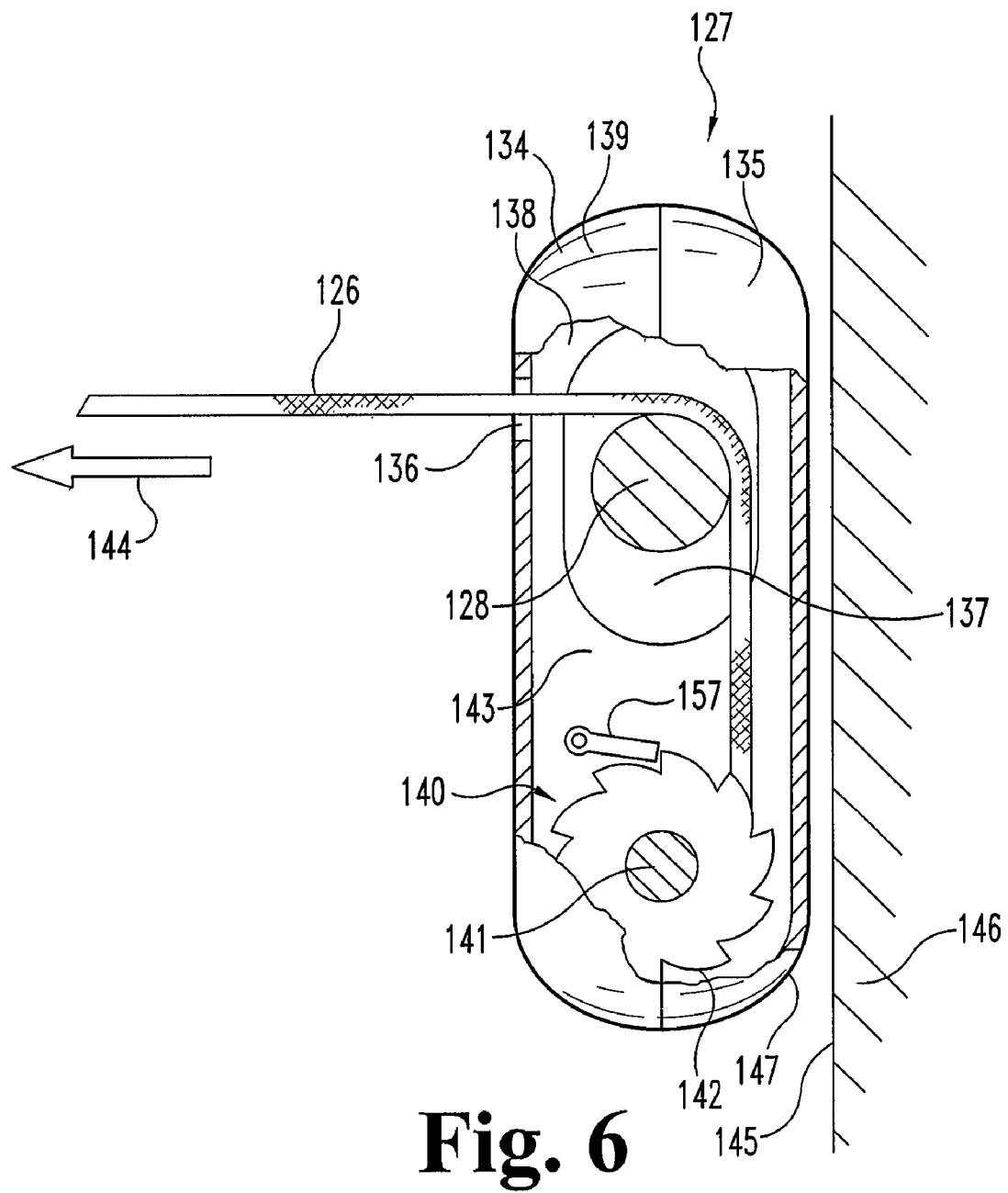
FIG. 6 is an enlarged, fragmentary, cross-sectional view taken along the line 6-6 of FIG. 5 and viewed in the direction of the arrows.

Retractor 127 (FIG. 6) includes a pair of shells 134 and 135 secured together forming a hollow interior 143. Shell 134 has a slot 136 through which web 126 freely extends outwardly from the interior of the shells. Further, an opening 137 is formed in the end walls 138 and 139 of the housing with load bearing member 128 extending freely therethrough. The load bearing member may take the form of a rod having its opposite ends attached to the frame of the child seat 120. The load bearing member or rod 128 extends generally horizontally as it extends from end 129 and then bends upwardly toward end 130.

Web 126 extends from connector 125 through slot 136 and then partially around, approximately ninety degrees, load bearing member 128 to a spring biased spool 140 having its axle 141 rotatably mounted to the opposite end walls 138 and 139 of shells 134 and 135. A pair of sprocket wheels 142 are mounted to spool 140 with a conventional pawl 157 releasably lockable with the ratchet wheels to allow extension of web 126 until locked with the anchor. A variety of commercially available automatic locking retractors are available to place within retractor housing 127. Withdrawal of web 126 in the direction of arrow 144 will cause retractor housing 127 to pivot in a counterclockwise direction about load bearing member 128. The outside surface 145 of child seat shell 146 facing shell 135 acts as a stop surface when contacted by the inwardly facing surface 147 of shell 135 thereby limiting the pivot motion about load bearing member 128.

Retractor 127 is slidably movable along rod 128. Once connector 125 is engaged with anchor 124, the retractor spool is operable under the pressure of the spool spring to pull the web into the retractor housing and to also move the retractor toward the end 129 of rod 128 when the child seat 120 is facing rearward. When the child seat 120 is facing forward and with connector engaged with the anchor, the retractor spool is operable to also pull the web into the retractor 127 and move retractor 127 toward end 130 of rod 128.

Figure 7:
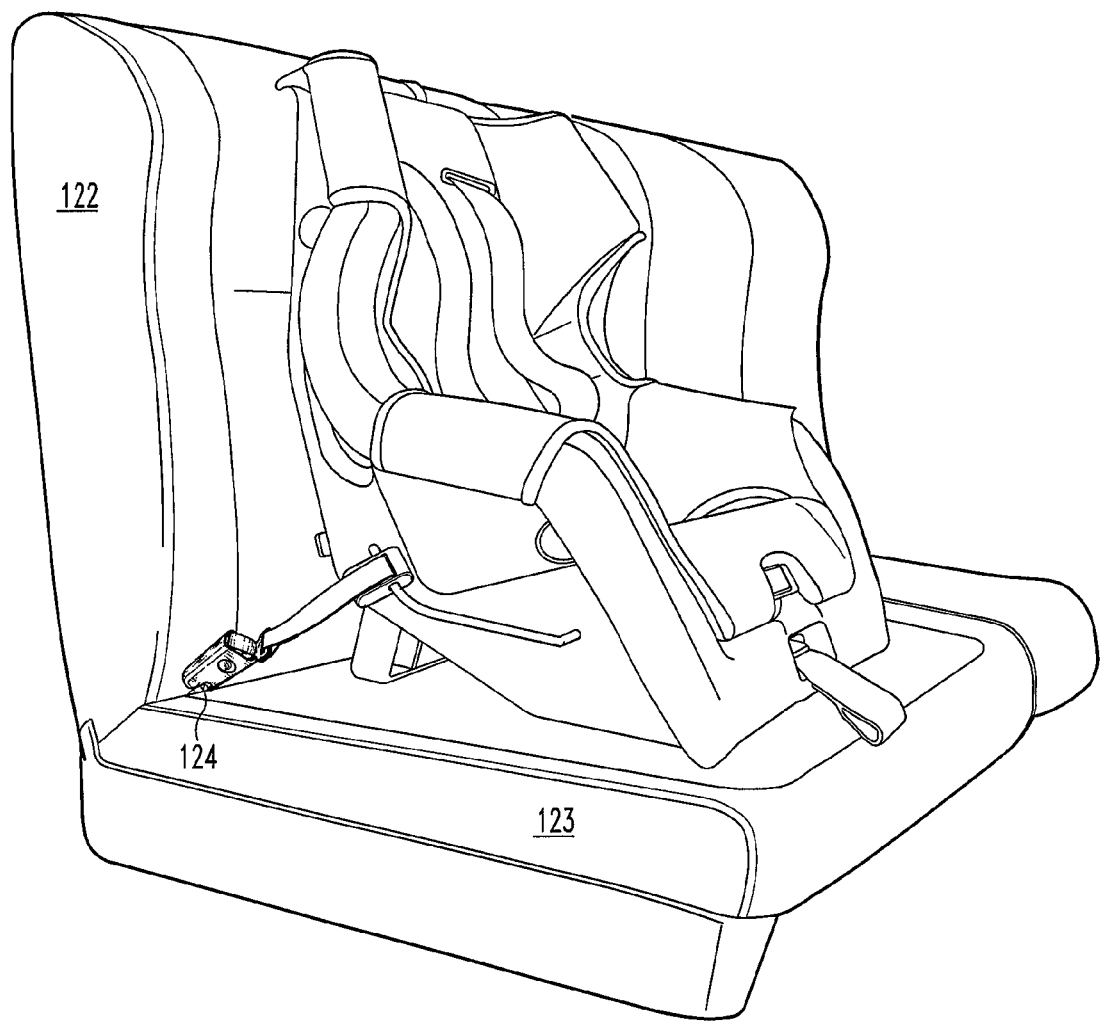
FIG. 7 is the same view as FIG. 5 only showing the child seat facing forward atop the vehicle passenger seat with the same retractor/connector shown in FIG. 5 engaged with the anchor.
Figure 8:
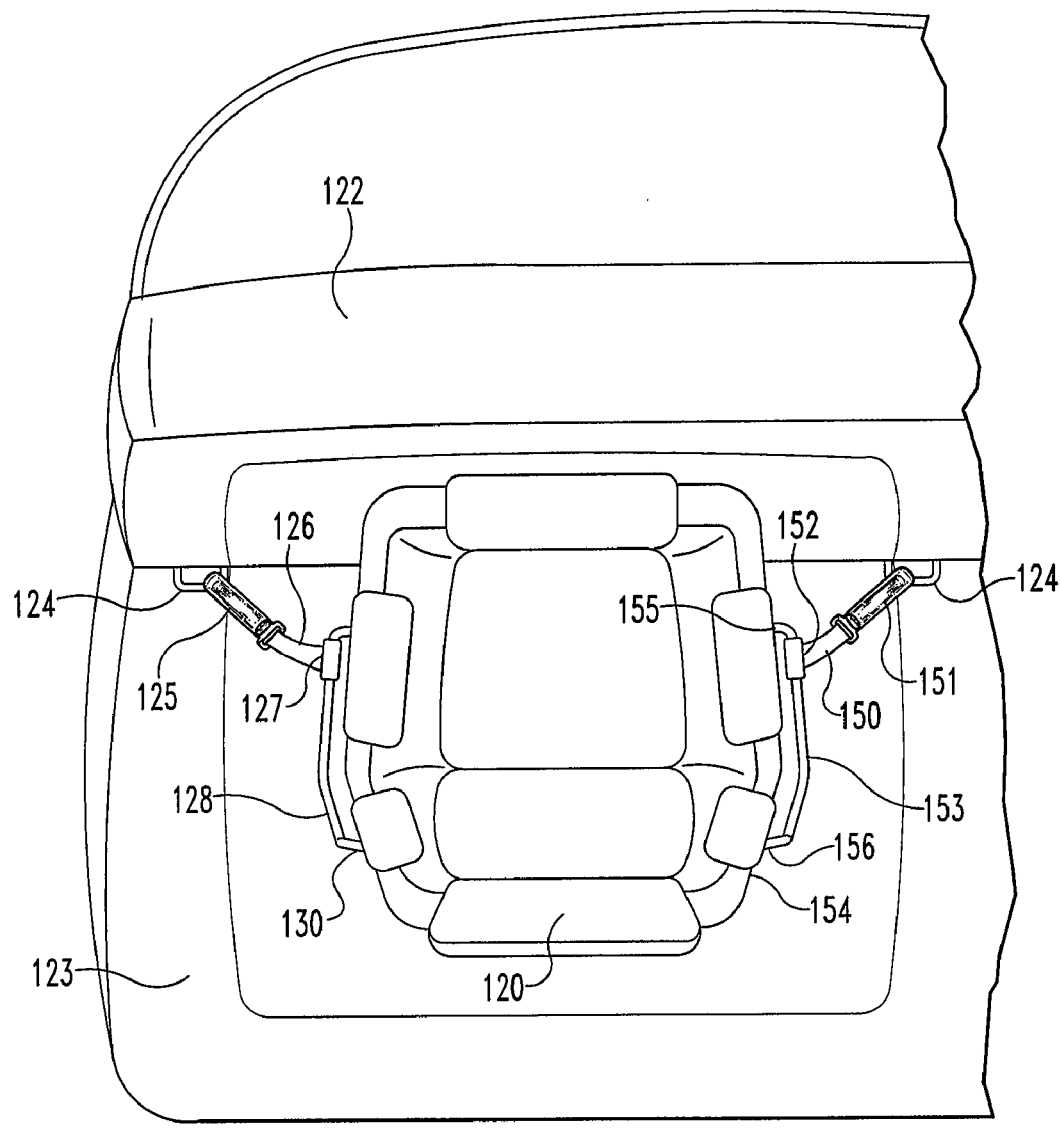
FIG. 8 is a top view of the child seat of FIG. 5.

A web 150, connector 151, and retractor 152 identical in construction and operation to web 126, connector 125, and retractor 127 are mounted on the opposite side 154 of child seat 120 (FIG. 8). A load bearing member 153 is mounted to the side 154 of the child seat and is identical to load bearing member 128 except load bearing member 153 extends from end 155 generally horizontally and then upwardly as it extends toward end 156. Thus, with connectors 125 and 151 lockingly engaged with two spaced apart anchors 124, the retractors 127 and 152 operate simultaneously to withdraw respectively webs 126 and 150 and move respectively toward ends 129 and 155 of rods 128 and 153 when the child seat is facing rearward holding the child seat securely to the vehicle seat. Likewise, when the child seat is facing forward, as illustrated in FIG. 7, and with both connectors engaged with both anchors, the retractors are operable to pull the webs into the retractor housings as the retractors move toward ends 130 and 156 of the load bearing members again holding the child seat securely to the vehicle seat.

Figure 9:
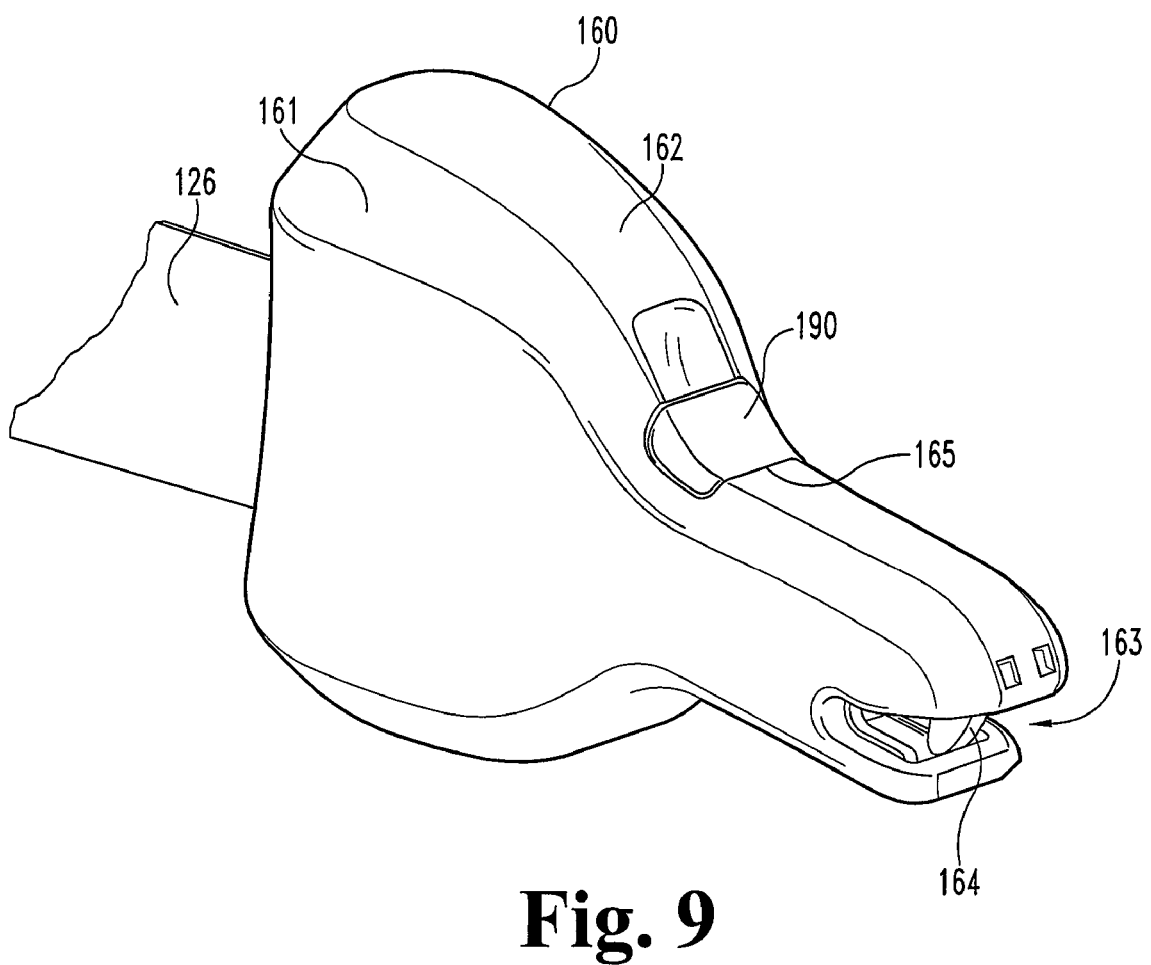
FIG. 9 is a perspective view of another alternate embodiment of the retractor/connector for attaching the child seat to a vehicle passenger seat.
Figure 15:
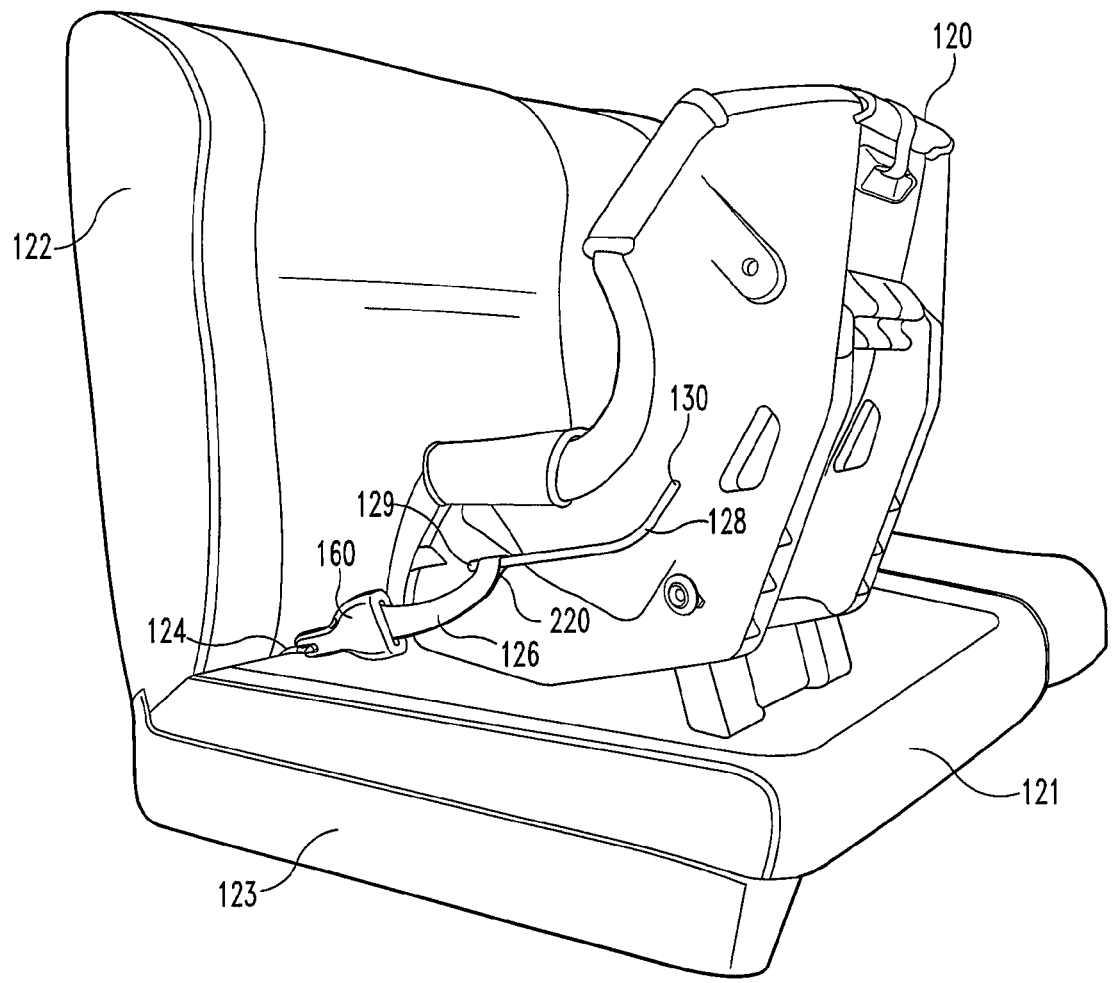
FIG. 15 is the same view as FIG. 5 only showing a further alternate embodiment with the connector/retractor 160 mounted to the end of web 126, in turn, slidably mounted to a guide rod.

An alternate embodiment of the retractor/connector mounted to the child seat load bearing member is depicted in FIGS. 9 and 15. Retractor/connector 160 includes a retractor mounted within housing shells 161 and 162 and also includes a movable lever 164 located at the mouth 163 of the housing to lockingly engage the anchor bight 124 located at the junction of the vehicle seat portion and vehicle seat back. A web 126 is wrapped upon the retractor spool and extends outwardly from the housing with the opposite end 220 of the web being mounted to a load bearing member 128 fixedly attached to the side wall of the child seat. End 220 forms a loop through which rod 128 freely extends allowing the looped end to freely slide from end 129 to end 130 of rod 128. The loop is formed by doubling back the web and fixedly attaching end 220 to the main body of the web. End 220 is located near end 129 of the load bearing member 128 when the child seat is facing rearward and located near end 130 when the child seat is facing forward. An identical retractor/connector 160 is slideably mounted to a load bearing member fixedly attached to the opposite side of the child seat to engage a second anchor 124 so that the pair of retractor/connectors securely mount the child seat to the vehicle seat.

Push button 190 (FIG. 9) is positioned within opening 165 of the housing and may be pushed inwardly into the housing to a first location whereat the retractor is cause to move to an unlocked position allowing web 126 to be withdrawn from or retracted into the retractor. Further depression of button 190 results in lever 164 pivoting upward allowing anchor rod 124 to extend into mouth 163. Release of button 190 causes lever 164 to pivot downward closing mouth 163 and locking anchor 124 within the mouth.

Figure 10:
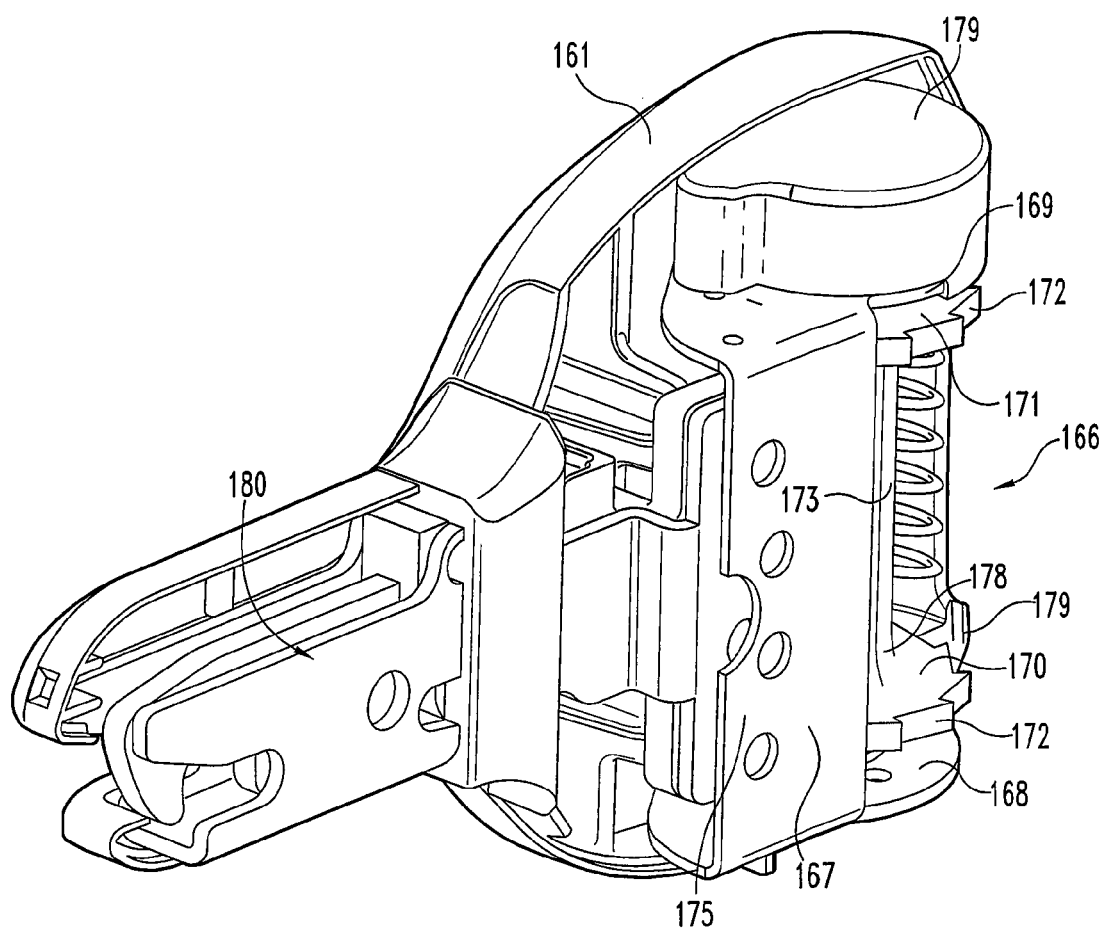
FIG. 10 is a perspective view of the retractor/connector of FIG. 9. with the right cover removed to illustrate the inner components.

Right cover 162 has been removed in FIG. 10 to depict the connector mechanism 180 and the retractor mechanism 166. Retractor 166 includes a main frame 167 composed of wall 175 integrally joined and arranged perpendicularly with respect to a pair of end flanges 168 and 169 to which spool 178 is rotatably mounted. The spool has its axle 173 rotatably mounted to flanges 168 and 169 with the axle extending through flange 169 into a spring housing 179 in which is located a helical spring having one end attached to frame 167 and the opposite end attached to the axle of spool 178. The spring is operable to normally urge the spool to rotate in a direction to withdraw web 126 into the housing composed of half covers 161 and 162. A pair of ratchet wheels 170 and 171 are fixedly mounted to axle 173 of the spool with the ratchet wheels having a plurality of teeth 172 to engage pawl 179 having its opposite ends lockingly engageable with teeth 172.

Figure 11:
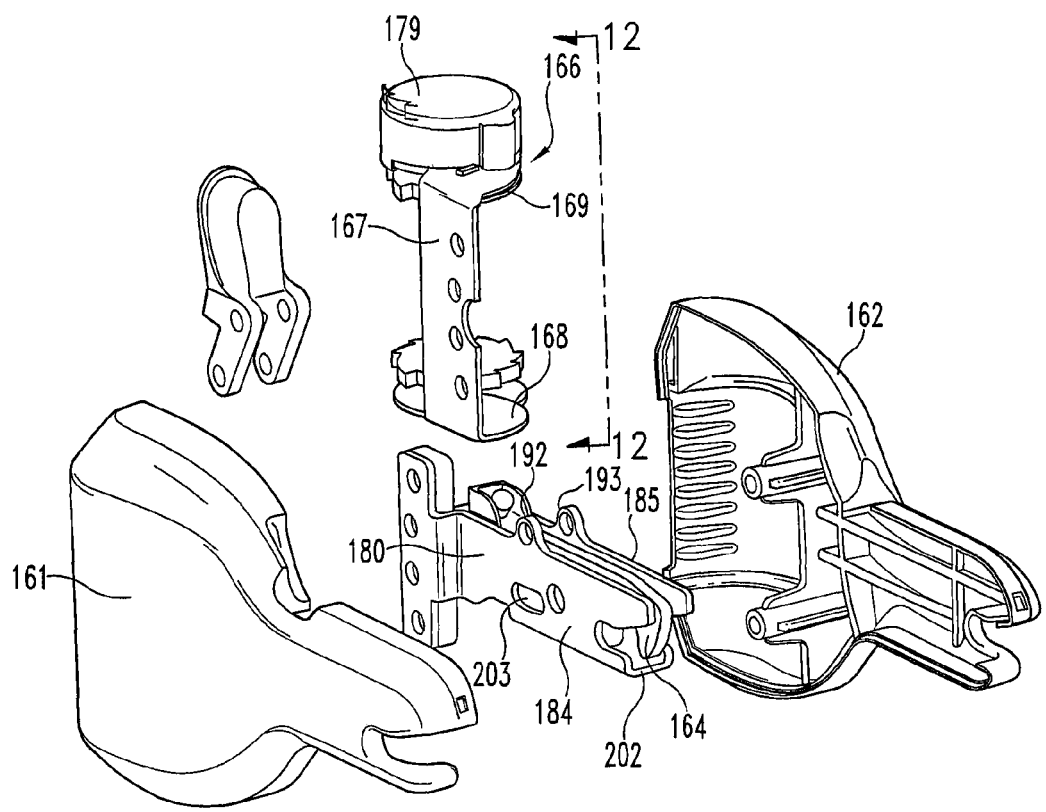
FIG. 11 is an exploded, perspective view of the retractor/connector of FIG. 9.
Figure 12:
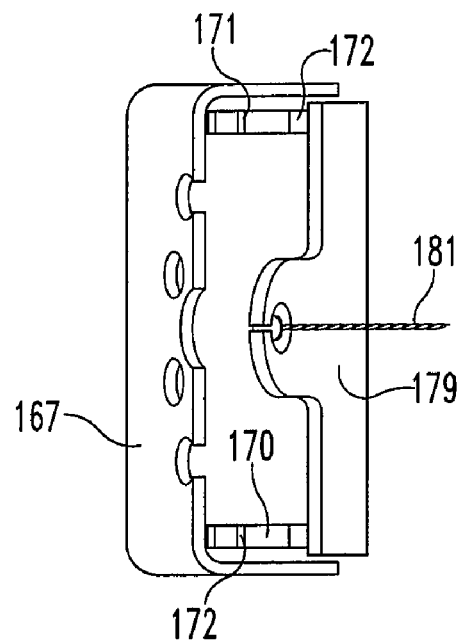
FIG. 12 is an enlarged side view of the retractor of FIG. 11 taken along a line 12-12 of FIG. 11 and viewed in the direction of the arrows.
Figure 13A:
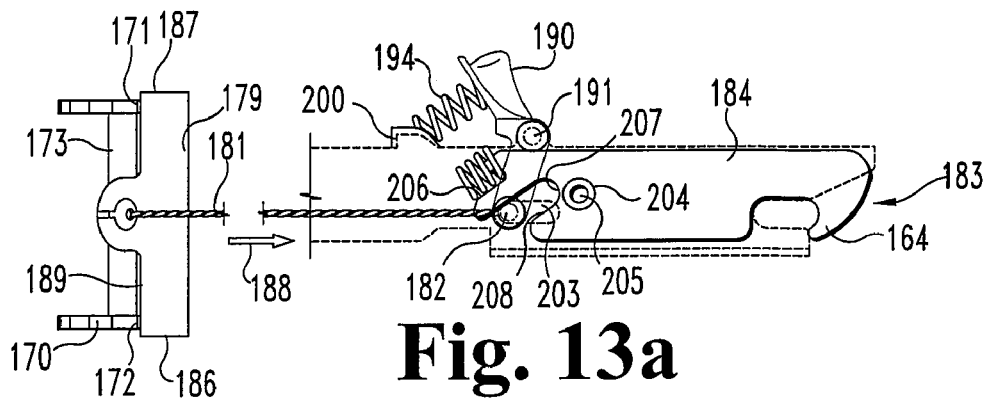
FIG. 13A is a cross sectional view of the connector and retractor of FIG. 11 showing the connector and retractor in a locked position.

Pawl 179 is attached to one end of a cable or elongated member 181 (FIG. 13A) that extends forwardly having its opposite end attached to a pin 182 slidably movable in slot 203 provided in the side walls 184 and 185 (FIG. 11) of connector 180. Pawl 179 has its opposite ends 186 and 187 (FIG. 13A) pivotally mounted to flanges 168 and 169 of frame 167. The pawl is arranged so that its rear edge 189 is engageable with the teeth of 172 of ratchet 170 and 171. Cable 181 is attached to pawl 179 adjacent edge 189 so that when cable 181 moves in the direction of arrow 188, pawl 179 is caused to pivot thereby pulling edge 189 away from teeth 172 and allowing the spool to rotate.

Figure 14:
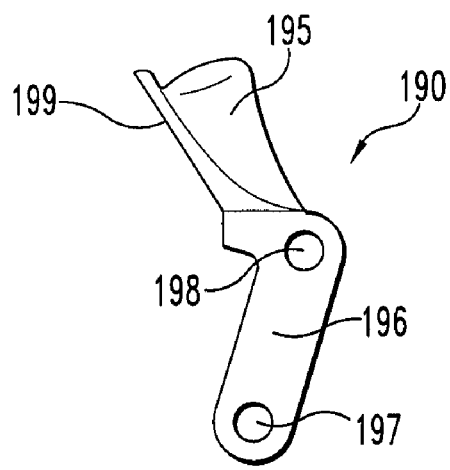
FIG. 14 is an enlarged side view of button 190.

Button 190 is pivotally mounted by pin 191 (FIG. 13A), in turn, fixedly mounted to upraised portions 192 and 193 (FIG. 11) formed respectively on connector side walls 184 and 185. Button 190 has an upper portion 195 (FIG. 14) and a lower portion 196 integrally joined together with hole 198 located therebetween through which pin 191 extends allowing the button to be rotated about pin 191. The inwardly facing surface 199 of button portion 195 engages one end of a helical spring 194 (FIG. 13A) having its opposite end abutting flange 200 formed on connector side walls 184 and 185. Helical spring 194 is operable to normally urge button 190 in a clockwise direction as viewed in FIG. 13A. The lower portion 196 of button 190 includes a hole 197 through which pin 182 extends. Thus, by depressing button 190 it is caused to rotate in a counterclockwise direction as viewed in FIG. 13A. Hole 197 also moves counterclockwise moving towards the connector mouth 183 carrying pin 182 along slot 203 formed in side walls 184 and 185 and moving cable 181 in the direction of arrow 188. Pawl 179 pivots apart from ratchet wheels 170 and 171 allowing the retractor spool to rotate.

The connector side walls 184 and 185 (FIG. 11) are integrally joined along their bottom edge portion to connector bottom wall 202 with the upper edge of side wall 184 being spaced apart from the upper edge of side wall 185 allowing lever 164 to pivot there above. Lever 164 (FIG. 13A) includes an aperture 204 through which pin 205 extends with the pin also extending through connector side walls 184 and 185 and allowing the lever to pivot on pin 205.

The end 206 of lever 164 closest to the retractor spool includes an upwardly extending slot 207 (FIG. 13C) with the slot having an open bottom end slidably receiving pin 182. As pin 182 is moved in the direction of arrow 188 (FIG. 13A), the pin contacts the upwardly slanting surface 208 forcing lever 164 to pivot in a counterclockwise direction as viewed in FIG. 13A. Slot 207 is arranged so that moving the upper portion 195 of button 190 from the most upward position depicted in FIG. 13A to the intermediate position illustrated in FIG. 13B causes the lever 164 to remain in a stationary position without pivoting upward even though cable 181 has pulled pawl 179 apart from the ratchet wheel teeth. Further downward movement of upper half 195 of button 190 from the intermediate position of FIG. 13B to the connector unlocked position of FIG. 13C results in pin 182 moving against upwardly inclined surface 208 thereby causing the lever 164 to pivot upwardly apart from mouth 183 and allowing the anchor 124 to enter or exit the mouth.

Figure 13B:
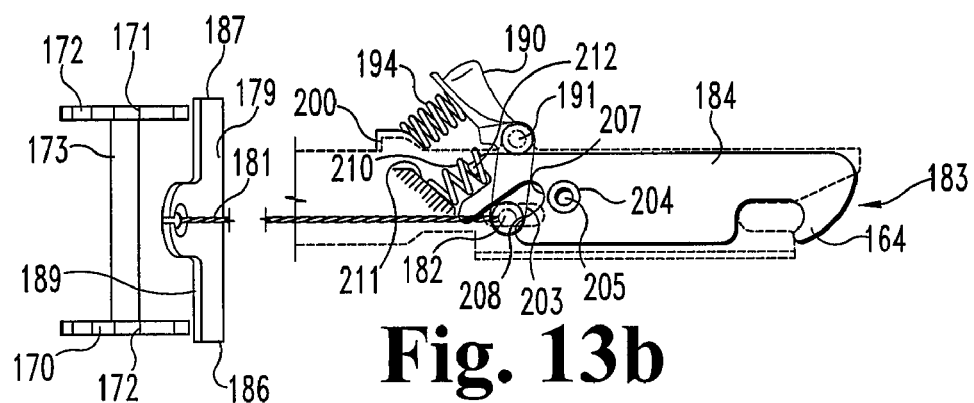
FIG. 13B is the same view as FIG. 13A only showing the activation button depressed to a first position moving the cable forward unlocking the retractor while keeping the connector locked.
Figure 13C:
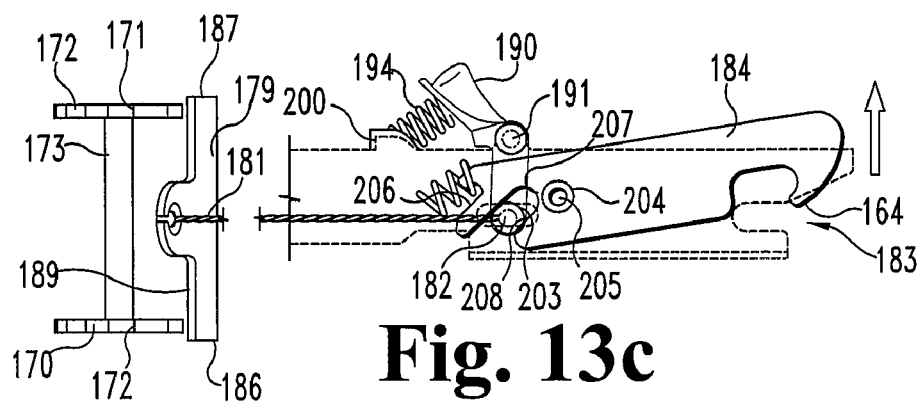
FIG. 13C is the same view as FIG. 13A only showing the activation button depressed to a second position moving the cable forward unlocking the retractor while also moving the connector to an unlocked or open position.

A helical spring 210 is engaged with a rearward extending projection 212 (FIG. 13B) formed in the rear edge of lever 164 with the opposite end of spring 210 engaged with wall 211 attached to side walls 184 and 185 with helical spring 210 operable to cause lever 164 to pivot in a clockwise direction as viewed in FIG. 13B keeping the lever end in position across mouth 183 thereby closing the mouth. Spring 210 is further operable when compressed by the pivoting counterclockwise action of lever 164 to allow the lever to pivot in the clockwise direction as the button is depressed.

Figure 16:
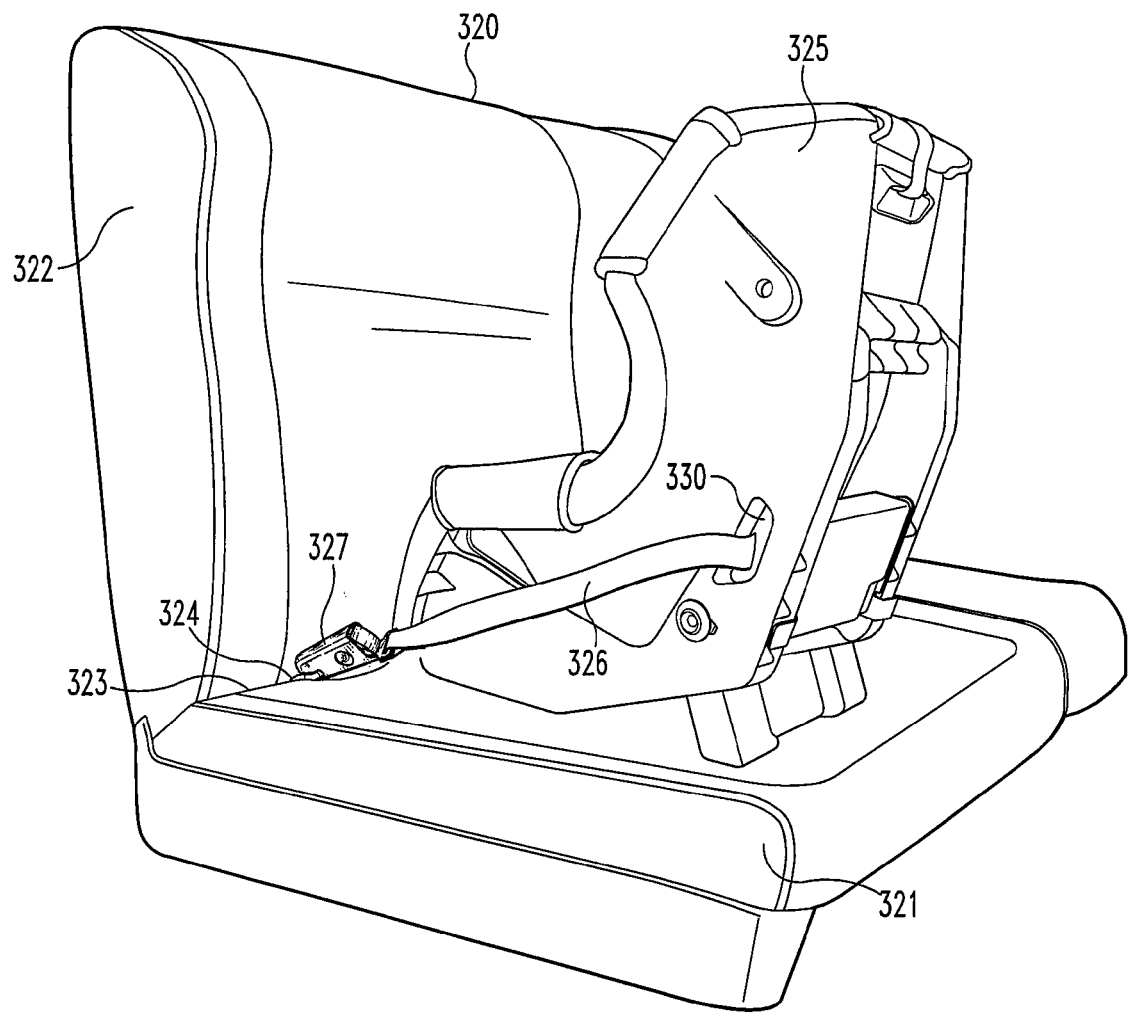
FIG. 16 is a perspective view of a rearwardly facing child seat mounted to a vehicle seat with the child seat equipped with a retractor mounting system.

Referring now more particularly to FIG. 16, there is shown a standard vehicle passenger seat 320 having a seat portion 321 and a back portion 322. Located in the bight 323 between the seat portion 321 and seat back 322 are a plurality of rod shaped anchors 324 to connect to devices for holding a child seat securely to the vehicle seat.

A rearward facing child seat 325 rests atop seat portion 321 for a child to be located in the child seat facing rearward. A pair of webs extend from the opposite sides of the child seat with each web having a connector mounted thereto for releasably and lockingly engaging the anchors 324 with an anchor located on each side of the child seat. One such web 326 is shown extending outwardly through a side wall slot or opening 330 of the child seat with a connector 327 mounted to the distal end of the web 326 and locked onto anchor 324. An identical web 328 with a connector mounted to the distal end thereof extends out through slot 329 (FIG. 17) extending through the opposite side wall child seat 325. The connector 331 mounted to web 328 is lockingly engaged with an anchor bight 324 mounted to the vehicle seat.

Figure 17:
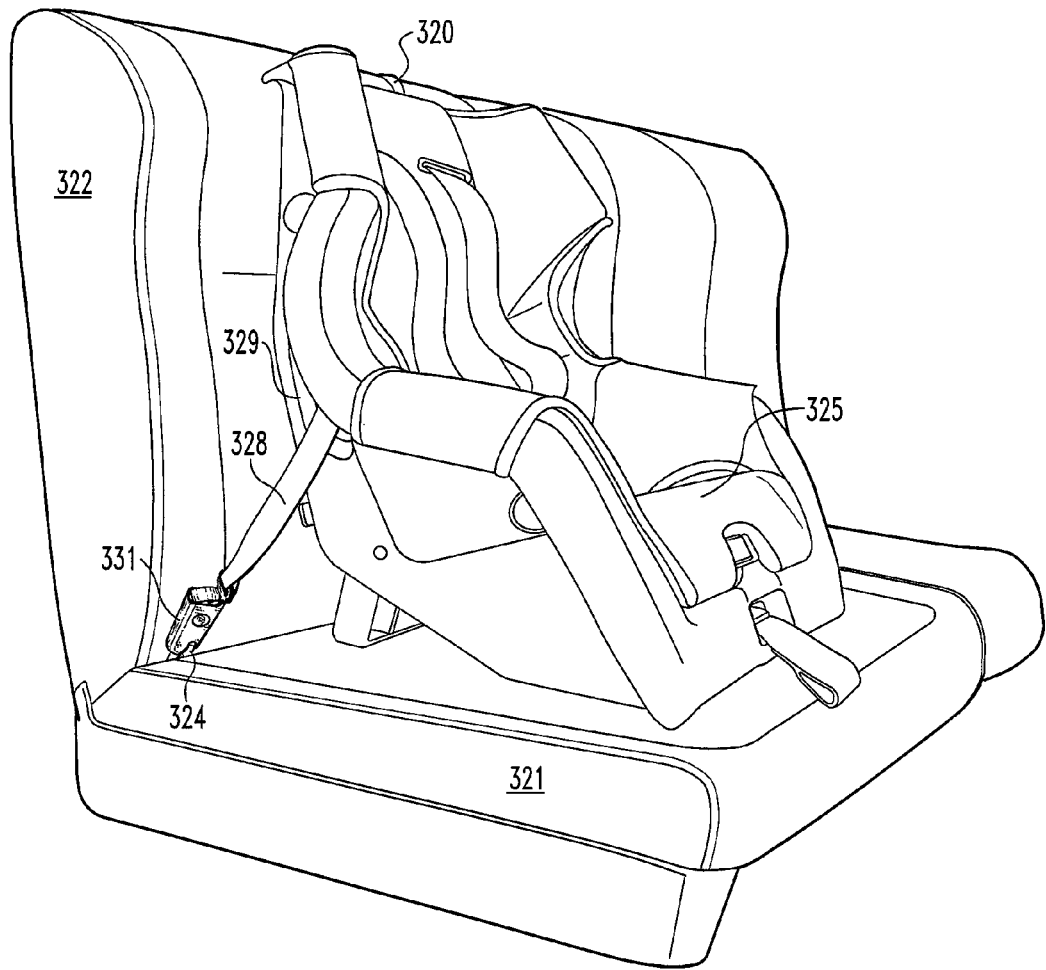
FIG. 17 is a perspective view of a forwardly facing child seat mounted to a vehicle seat with the child seat equipped with the same retractor mounting system used with the child seat in FIG. 16.

The child seat may be removed from the vehicle seat by disengaging the connectors mounted to the distal ends of webs 326 and 328 from anchors 324 affixed to the vehicle seat 320. The anchors may also be fixedly mounted to the frame of the vehicle. In order to accommodate a forward facing child seat, seat 325 is rotated 180 degrees as depicted in FIG. 17 with the webs being extended through slots 330 and 329 and extending rearward so that the connectors 327 and 331 may engage the anchors mounted to the vehicle seat on the opposite sides of the child seat. In FIG. 17, web 328 extends rearward having a connector 331 mounted thereto with the connector engaged with anchor 324. Similarly, web 326 located on the opposite of the child seat when the child seat is facing forward extends rearward so that connector 327 is engaged with the anchor located on the side of the child seat closest to web 326. Connectors 327 and 331 may be commercially available connectors. The connectors 25 and 38 (FIG. 3), 125 and 151 (FIG. 8), and 327 and 331 may be the connector disclosed in FIGS. 38-44 disclosed in the commonly owned U.S. Pat. No. 6,962,394 which is herewith incorporated by reference.

Figure 18:
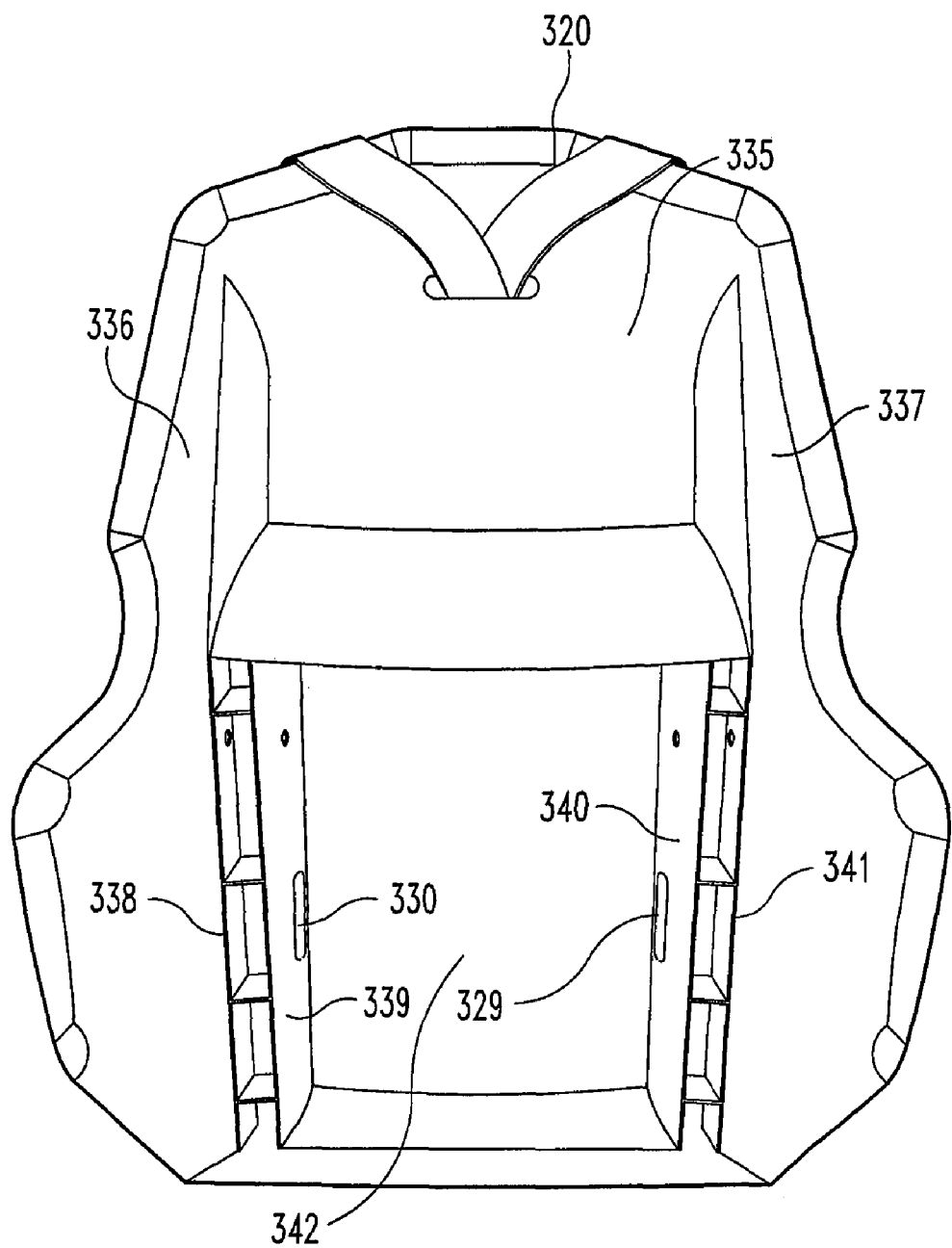
FIG. 18 is a rear view of the child seat of FIG. 16 with the retractor mounting system removed therefrom to illustrate the construction of a typical child seat.
Figure 19:
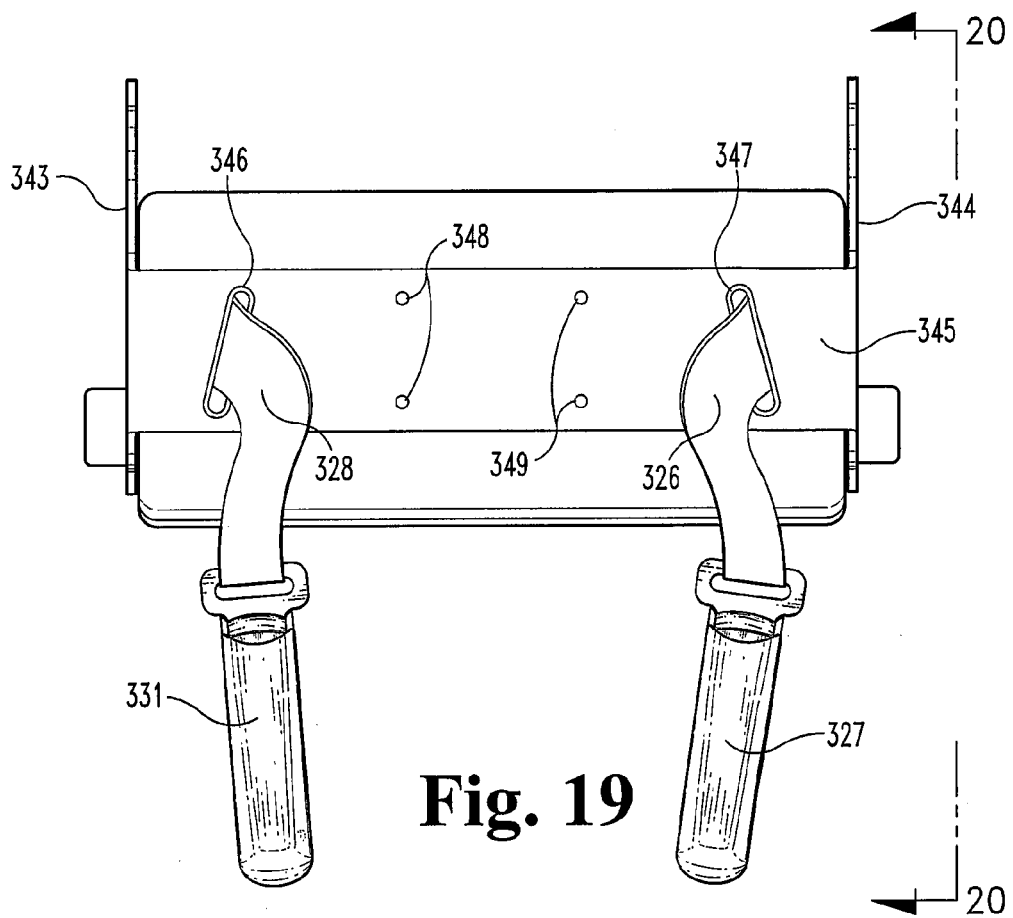
FIG. 19 is an enlarged front view of the retractor mounting bracket and housing with the retractor webs extending therefrom.
Figure 20:
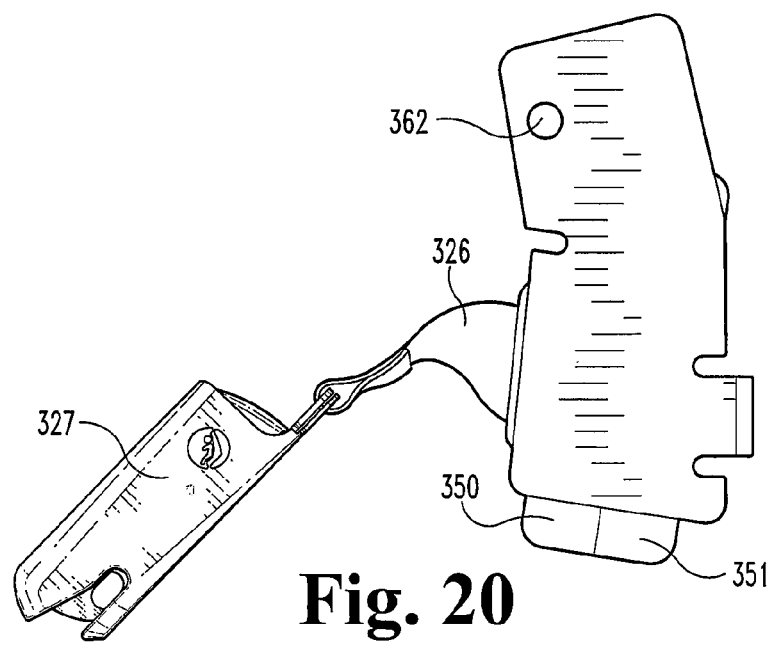
FIG. 20 is a side view looking in the direction of arrows 20-20 of FIG. 19.
Figure 21:
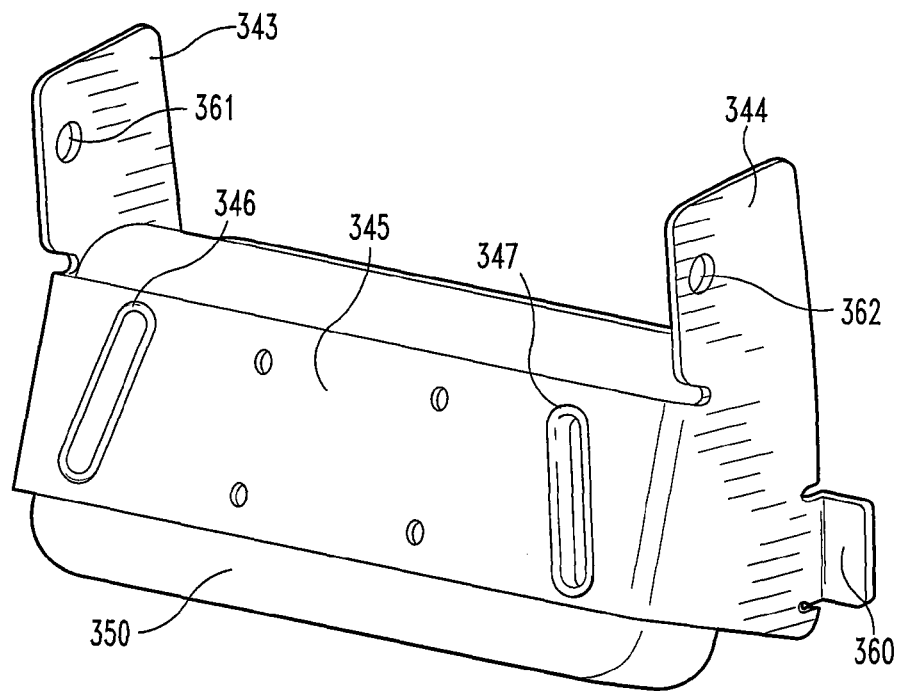
FIG. 21 is a front perspective view of the mounting bracket and housing of FIG. 19.
Figure 22:
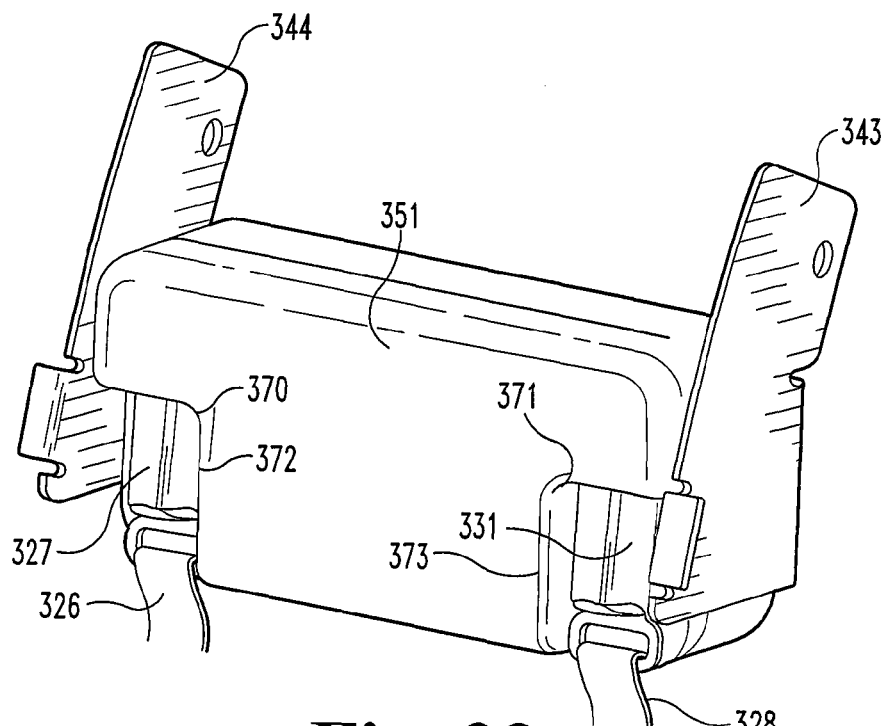
FIG. 22 is a rear perspective view of the housing and bracket of FIG. 21.

Referring to FIG. 18, a rear view of child seat 320 is shown without the retractor mounting system mounted thereto to more clearly illustrate the construction of the child seat. Seat 320 includes a back portion 335 attached to a pair of spaced apart side walls 336 and 337 through which slots 330 and 329 extend. Extending at least partially along the back 335 of the child seat are a first pair of spaced apart strengthening ribs 338 and 339 and a second pair of spaced apart strengthening ribs 340 and 341. Ribs 338 and 339 are located immediately adjacent side wall 336 whereas ribs 340 and 341 are located immediately adjacent side wall 337. In between ribs 339 and 340 is a recessed area 342 into which the retractor mounting system of the present invention may be mounted.

Referring to FIGS. 19-22, there is shown the retractor mounting bracket consisting of a pair of spaced apart side walls 343 and 344 integrally joined together by wall 345 that extends perpendicularly with respect to each wall 343 and 344. Wall 345 includes a pair of slots 346 and 347 through which respectively the webs 328 and 326 extend having mounted to their distal ends a pair of connectors 331 and 327. Two pairs 348 and 349 of retractor mounting holes are provided on wall 345 to receive standard fasteners mounting a pair of retractors to wall 345 with retractors having webs 328 and 326 wrapped thereon. A cosmetic cover consisting of a pair of mating covers 350 and 351 is mounted to and extends between side walls 343 and 344 and normally conceals the retractors mounted within the cover.

Figure 23:
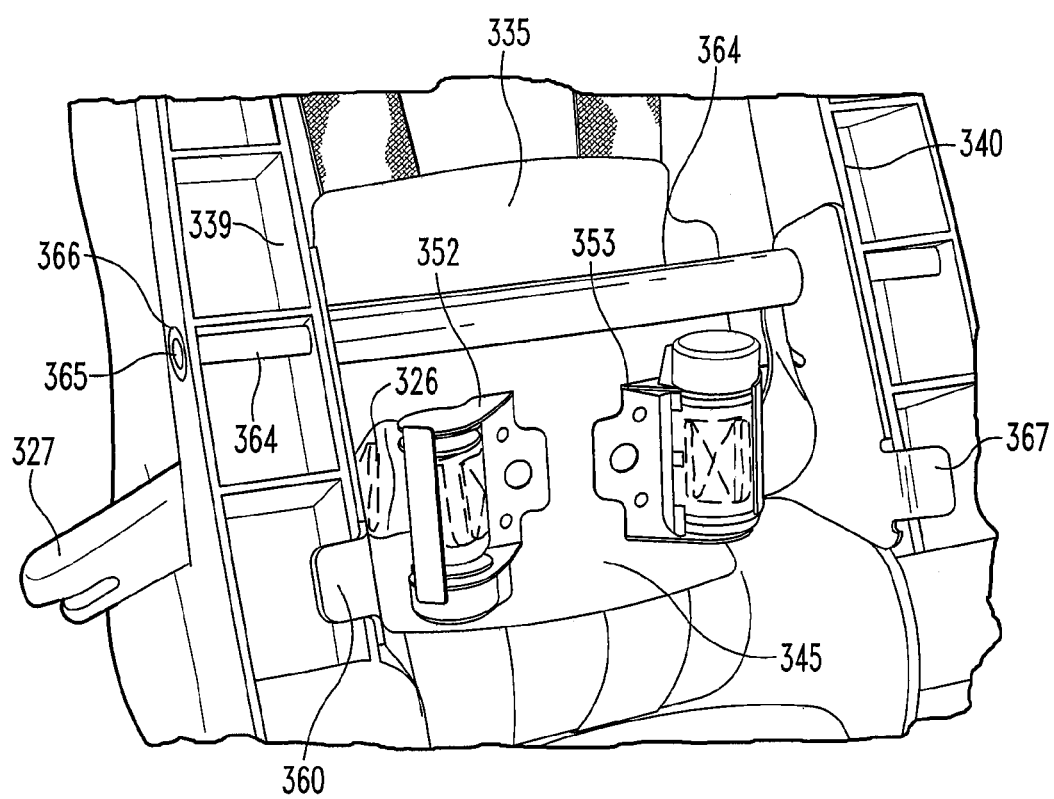
FIG. 23 is a fragmentary, rear view of the child seat with a pair of retractors mounted thereto without the cosmetic cover mounted to the mounting bracket.

FIG. 23 illustrates the retractor mounting bracket mounted to the child seat. Conventional automatic locking retractors 352 and 353 are fixedly mounted to wall 345 within covers 350 and 351. Each retractor includes a spool upon which a web is mounted with the spool being spring biased to allow for the retraction and extension of the web. For example, retractor 352 includes web 326 extending through the side wall of the child seat with connector 327 mounted to the distal end thereof. Likewise, retractor 353 has a web 328 extendable therefrom with web 328 extending through the child seat side wall and having mounted to the distal end thereof connector 331.

The child seat back wall 335 is spaced apart from bracket wall 345 allowing webs 326 and 328 to extend through wall 345 and then in the gap between the child seat back wall 335 and wall 345 to slots 330 and 329 with the webs then extending outwardly to the anchors.

Side walls 344 and 343 of the refractor mounting bracket are positioned immediately inward and adjacent respectively ribs 339 and 340 of the child seat. Each retractor mounting bracket sidewall includes a flange positioned against the child seat ribs. For example, side wall 344 (FIG. 21) includes an outwardly extending flange 360 that is positioned against rib 339 (FIG. 18). Similarly, sidewall 343 includes a flange 367 adjacent rib 340. A pair of aligned holes 361 and 362 (FIG. 21) are provided respectively in sidewalls 343 and 344 and receive the opposite externally threaded ends 365 of rod 364 (FIG. 18) extending through the ribs, and in turn, threadedly received by conventional fastening devices, such as, internally threaded sleeves 366 to secure rod 364 to the ribs 339 and 340. Thus, the retractor mounting bracket is securely fastened to the child seat with flanges 360 and 367 spacing wall 345 with respect to the child seat back wall 335.

Cosmetic cover 351 (FIG. 22) faces outwardly from the child seat and has its lower corners 370 and 371 indented forming respectively slots 372 and 373 between cover 351 and respectively side walls 344 and 343. Slots 372 and 373 are sized to respectively receive and store connectors 327 and 331 when not in use. Connectors 327 and 331 are connected respectively to webs 326 and 328 extending outwardly from the retractors located between covers 350 and 351. Webs 326 and 328 extend outwardly respectively from slots 347 and 346 (FIG. 19) and then around brackets 344 and 343 to the outwardly facing surface of cover 351 whereat the webs have connectors 327 and 331 stored within the cover slots. Cover 351 may include an opening into which the connectors may be slid vertically.

While the invention has been illustrated and described in detail in the drawings and foregoing description, the same is to be considered as illustrative and not restrictive in character, it being understood that some of the embodiments have been shown and described and that all changes and modifications that come within the spirit of the invention are desired to be protected.

What is claimed is:

1. A mount for selectively securing in a forward facing position and a rearward facing position a child seat to vehicle anchors comprising:
    a pair of retractor guides on a child seat with said child seat located therebetween, said guides having opposite ends;
    a pair of retractors one each mounted relative to said guides, said retractors having webs with distal ends extendable and retractable therefrom with said retractors and webs being slidable between and positionable at said opposite ends of said guides depending on the child seat facing forward or rearward; and,
    a pair of anchor connectors connected to said distal ends of said webs, said connectors lockingly engageable with anchors provided on said vehicle to secure said child seat to said vehicle seat.

2. The mount of claim 1 wherein:
    said retractor guides include a pair of housings with web slots opening externally from within said housings, said web slots have enlarged opposite openings; and,
    said retractors one each are located within said housings and have webs extendable and retractable through said web slots, said retractors and webs being slidable between said opposite ends of said web slots.

3. The mount of claim 2 wherein:
    said connectors have mounting flanges mountingly receiving said distal ends of said webs; and,
    said slots are sized between said enlarged opposite ends of said slots to allow passage of said web therethrough but limit passage of said mounting flange therethrough whereas said mounting flanges with said webs may move together through said enlarged opposite openings allowing positioning of said connectors against said housings at said opposite ends.

4. The mount of claim 3 wherein:
    said slots each follow a concave curve when viewed from atop said child seat.

5. The mount of claim 4 wherein:
    each of said housings includes a metal wall adjacent said slots limiting movement of said webs along said concave curve.

6. The mount of claim 1 wherein:
    said retractor guides include a pair of curved rods with opposite rod ends; and,
    said retractors one each slidably mounted on said rods between said opposite rod ends.

7. The mount of claim 6 wherein:
    said retractors are positioned adjacent said child seat to limit pivoting motion about said rods as said retractors move on said rods between said opposite rod ends.

8. The mount of claim 7 wherein said child seat has a forward seat portion upon which a child may be seated and a back portion against which a child may rest and wherein:
    said opposite rod ends are located at a forward seat portion of said child seat and at a back portion of said child seat.

9. A child seat mountable to a vehicle having a vehicle seat and vehicle anchors comprising:
    a child seat frame upon which a child may be seated and having opposite sides, said child seat frame having a forward portion and a rearward portion;
    a pair of guides provided on said opposite sides of said frame; and,
    a pair of web retractors and a pair of anchor connectors, said retractors slidably mounted relative to said guides, said retractors are slidable depending on said child seat frame facing forward or rearward, said retractors having extendable and retractable webs wherein said webs have distal ends with said anchor connectors connected to said distal ends and proximal ends connected to said retractors, and said connectors releasably engageable with vehicle anchors to secure said child seat to a vehicle.

10. The child seat of claim 9 wherein:
    said guides have opposite end portions located at said forward portion of said child seat and at said rearward portion of said child seat with said guides being curved therebetween.

11. The child seat of claim 10 wherein said guides are concave when viewed from atop said child seat when resting atop said vehicle seat.

12. The child seat of claim 11 wherein:
    said guides include a pair of cavities extending between said opposite end portions of said guides and have said retractors slidably mounted therein between said opposite end portions, said cavities include outwardly opening slots extending between said opposite end portions sized to allow movement of said webs therethrough.

13. The child seat of claim 12 wherein:
    said slots have enlarged opposite slot ends; and,
    said connectors having mounting flanges affixed to said distal ends of said webs, said mounting flanges and said distal ends sized to move together through said slots only at said enlarged opposite slot ends but not therebetween.

14. The child seat of claim 9 wherein:
    said webs have ends slidably mounted to said guides which are rods mounted aside said child seat frame.

15. A child seat mountable to a vehicle having a vehicle seat and vehicle anchors comprising:
    a child seat frame upon which a child may be seated and having opposite sides, said child seat frame having a forward portion and a rearward portion;
    a pair of guides having cavities provided on said opposite sides of said frame;
    a pair of web retractors slidably mounted in said cavities, said retractors are slidable depending on said child seat frame facing forward or rearward, and said web retractors having extendable and retractable webs with distal ends; and,
    a pair of anchor connectors mounted to said distal ends and releasably engageable with vehicle anchors to secure said child seat to a vehicle.

16. The child seat of claim 15 wherein:
    said cavities have opposite end portions located at said forward portion of said child seat frame and at said rearward portion of said child seat frame, said cavities include outwardly opening slots extending between said opposite end portions, said slots sized to allow movement of said webs therethrough; and, said retractors slidable to said opposite end portions at said forward portion with said connectors engageable with said anchors and said child seat frame facing rearward, said retractors positioned at said opposite end portions at said rearward portion with said connectors engageable with said anchors and said child seat frame facing forward.

17. The child seat of claim 16 wherein:

said slots have enlarged opposite slot ends; and, said connectors having mounting flanges affixed to said distal ends of said webs, said mounting flanges and said distal ends sized to move together through said slots only at said enlarged opposite slot ends but not therebetween.

18. The child seat of claim 17 wherein:

said guides are connected together and to said child seat frame.

19. A child seat mountable to a vehicle having a vehicle seat and vehicle anchors comprising:

a pair of housings on a child seat with said child seat located therebetween, said housings defining web slots opening externally from within said housings, said web slots having enlarged opposite openings located at opposite ends of said web slots;

a pair of retractors one each located within said housings, said retractors having webs with distal ends extendable and retractable through said web slots; and, a pair of anchor connectors connected to said distal ends of said webs, said anchor connectors and said webs being retractable at said opposite ends of said web slots when the child seat is not mounted to a vehicle, said anchor connectors and said webs being extendable at said opposite ends of said web slots for mounting the child seat to a vehicle.

20. A mount for selectively securing in a forward facing position and a rearward facing position a child seat to vehicle anchors comprising:

a pair of rods mounted on opposite sides of a child seat, said rods having opposite ends;

a pair of retractors one each mounted relative to said rods, said retractors having webs with distal ends extendable and retractable therefrom with said retractors and webs being slidable between and positionable at said opposite ends of said rods depending on the child seat facing forward or rearward; and, a pair of anchor connectors connected to said distal ends of said webs, said connectors lockingly engageable with anchors provided on said vehicle to secure said child seat to said vehicle seat.

* * * * *